United States Patent [19]

Fiedler

[11] Patent Number: 4,659,575

[45] Date of Patent: Apr. 21, 1987

[54] METHOD AND APPARATUS FOR ENTRAINING GAS IN ICE CREAM MIX

[75] Inventor: Armin Fiedler, Chicago, Ill.

[73] Assignee: Twistee Treat Corporation, North Fort Myers, Fla.

[21] Appl. No.: 778,874

[22] Filed: Sep. 23, 1985

[51] Int. Cl.⁴ .............................................. A23G 9/04
[52] U.S. Cl. ................................... 426/317; 426/319; 426/565; 426/474; 426/477; 261/DIG. 7; 261/DIG. 16; 261/121.1
[58] Field of Search .............. 426/564, 565, 317, 319, 426/474, 477, DIG. 7; 261/121 R, DIG. 16; 62/342

[56] References Cited

U.S. PATENT DOCUMENTS

| | | | |
|---|---|---|---|
| 1,329,246 | 1/1920 | Kirkpatrick et al. | 426/474 |
| 2,343,767 | 3/1944 | Getz | 426/565 |
| 2,507,477 | 5/1950 | MacDonald et al. | 107/54 |
| 2,677,942 | 5/1954 | Schott et al. | 62/114 |
| 2,915,023 | 12/1959 | Rapaport | 107/31 |
| 3,256,100 | 6/1966 | Bernstein et al. | 426/565 |
| 3,520,698 | 7/1970 | Katz et al. | 99/139 |
| 3,526,517 | 9/1970 | Shaffer et al. | 99/139 |
| 3,572,550 | 3/1971 | Colomina et al. | 261/DIG. 7 |
| 3,914,453 | 10/1975 | Gawrilow | 426/553 |
| 3,961,494 | 6/1976 | Schaefer et al. | 426/565 |
| 3,962,473 | 6/1976 | Lilov | 426/282 |
| 4,059,047 | 11/1977 | Sollich | 99/455 |
| 4,104,412 | 8/1978 | Fisher et al. | 426/572 |
| 4,157,017 | 6/1979 | Reid | 426/474 |
| 4,468,409 | 8/1984 | Metzroth | 426/659 |

FOREIGN PATENT DOCUMENTS 2059791  4/1981  United Kingdom ......... 261/DIG. 7

OTHER PUBLICATIONS

Pacesetter Operating Manual, Pace Industries, (date unknown).

*Primary Examiner*—Jeanette Hunter
*Attorney, Agent, or Firm*—George H. Gerstman

[57] ABSTRACT

An overrun-producing gas such as nitrous oxide is introduced into a lower portion of a tank containing unfrozen ice cream mix at elevated pressure, until sufficient gas is entrained in the ice cream mix to provide the desired overrun. The gas may be collected at an upper portion of the tank and recirculated back into the lower portion of the tank. Pressurized air may also be introduced through the top of the tank while the gas-entrained contents are dispensed into pressurized containers, to maintain a predetermined pressure thereon.

15 Claims, 1 Drawing Figure

METHOD AND APPARATUS FOR ENTRAINING GAS IN ICE CREAM MIX

BACKGROUND OF THE INVENTION

It is known to entrain air and other gases into ice cream to reduce its density and to soften the product. For example, ice cream freezers are known having an agitator so that the ice cream is churned as it is frozen, to entrain air. A disadvantage arises from this system, in that the high shear to which the product is subjected during this process can cause product breakdown in a manner analogous to milk turning into butter as it is churned.

Another known machine of the prior art carries a five gallon container of the unfrozen ice cream mix in such a manner that the container is rocked back and forth, while pressurized nitrous oxide is added to the ice cream mix. A disadvantage of this system, as well as of the previously described system, is that the control of the "overrun" is difficult, with large variations occurring from batch to batch. The term "overrun" refers to the amount of gas which becomes entrained in the ice cream mix to increase its volume. A frozen ice cream product with an overrun of 55% or 60% is a typical "soft serve" ice cream.

By this invention, a technique is provided for introducing a compatible, overrun-producing gas into ice cream mixes with greater accuracy for the final overrun produced, so that product variability is minimized. In the ice cream business, there is a significant need to keep the overrun constant, in that in many operations ice cream is dispensed into the cone or dish by weight. If the overrun is low on a given lot, compared with a previous lot, the volume of the same weight of ice cream will be less. This can create nonuniformity in retail delivery.

DESCRIPTION OF THE INVENTION

In accordance with this invention a method and apparatus are disclosed for introducing a compatible, overrun-producing gas into a lower portion of a tank containing unfrozen ice cream mix at elevated pressure, until sufficient gas bubbles are entrained in the ice cream mix to provide the desired overrun.

The elevated pressure may, under some circumstances, be as low as about 20 psi., but typically, the elevated pressure is 30–200 psi, most preferably in the vicinity of 50 psi. There appears to be no upper limit to the pressure that can be used, but there generally is no practical need to exceed 50–80 psi. The pressures stated in this application are measured from atmospheric pressure as the zero point.

The overrun-producing gas preferably is nitrous oxide, which appears to exhibit an absorptive capacity with the ice cream mix to provide results improved over air. However, carbon dioxide may be used if desired, or any other equivalent gas which is suitable for contact with food, and which can be entrained into an ice cream mix under pressure to form a uniform product.

It is contemplated that the term "ice cream mix" can include a large variety of forms of ice cream, ice milk, frozen custard, frozen yogurt, or the like.

As the overrun-producing gas bubbles pass through the unfrozen ice cream mix, which is desirably at refrigerator temperatures to avoid spoiling but above its freezing temperature. The gas which is not entrained collects at an upper portion of the tank. From there it can be recirculated back into the lower portion of the tank.

Likewise, when the desired amount of gas has been entrained into the ice cream mix to produce an ice cream of the desired overrun upon freezing, pressurized gas, typically air, may be introduced through the top of the tank while the gas-entrained ice cream mix is dispensed from the tank into pressurized containers for transport or the like, so that a predetermined pressure may be maintained on the ice cream mix until it is frozen or thereafter dispensed into a cone or a dish. By this, the desired overrun characteristics of the ice cream mix can be preserved, even though the ice cream mix may be transported a considerable distance, and not frozen until later. As a further advantage, the presence of nitrous oxide in the ice cream mix provides added retardation of spoilage over air-entrained ice cream mix at the same temperature.

It is preferred for the tank used for the process of this invention to have a volume of at least 100 gallons, and substantially more than that in many circumstances, for example, 1000 to 4000 gallons. It is, of course, most difficult to rock such huge tanks in a manner analogous to the prior art. This present invention, which does not require the presence of rocking of the tank (but does not necessarily exclude it either), may be used with large volume tanks for scaled-up commercial operations, without the need for performing the process on a multitude of 5 gallon containers.

As stated, after the gassing process of this invention has been performed, the gas-entrained ice cream mix may be dispensed into pressurized containers without a major change in the pressure of the material, so that the liquid ice cream mix can be frozen at a later time into an ice cream of known overrun.

DESCRIPTION OF A SPECIFIC EMBODIMENT

Figure 1:
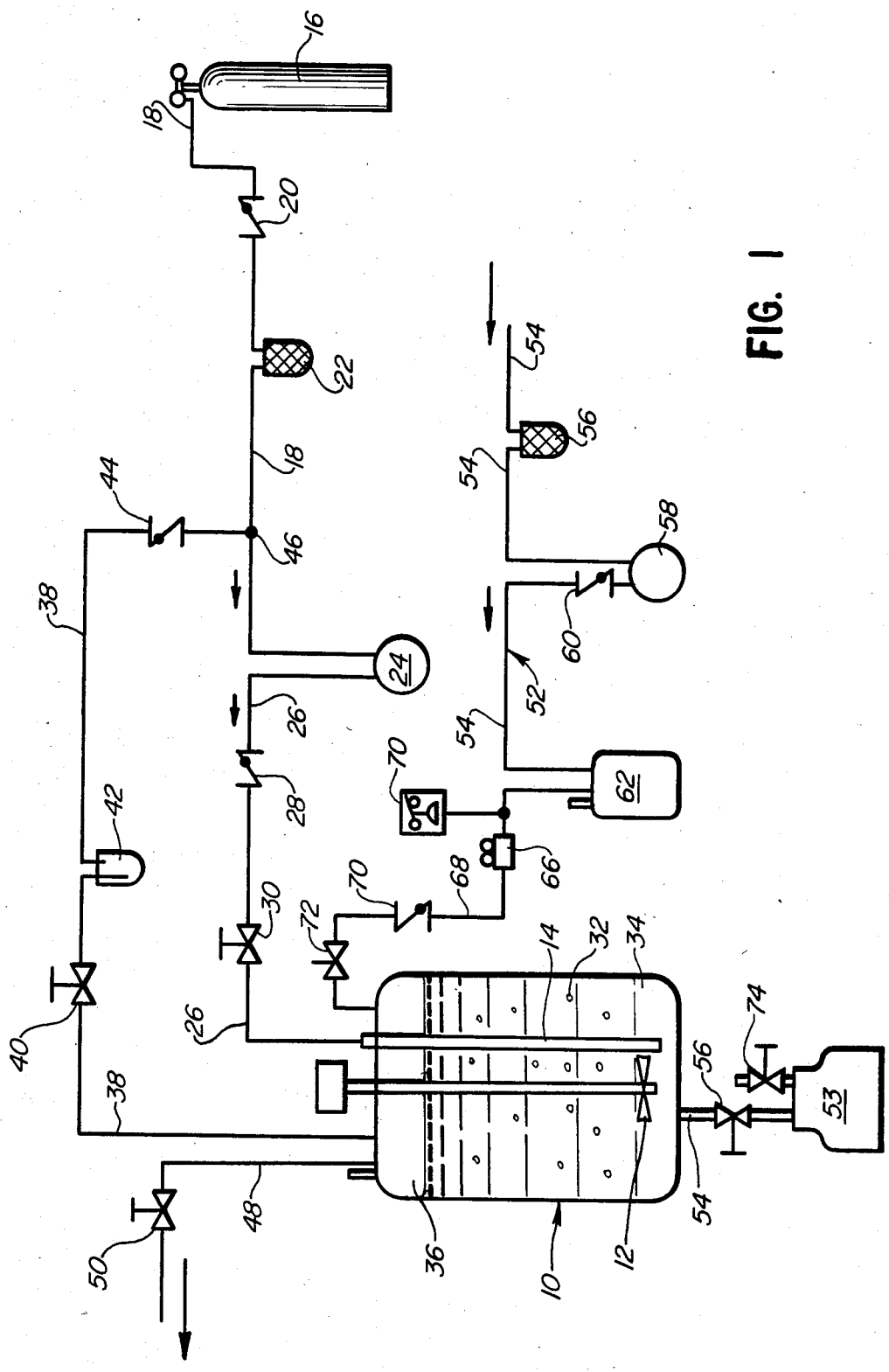
FIG. 1 is a schematic view of apparatus for performing the process of this invention.

In the drawing, apparatus for entraining gas into ice cream mix is shown. Mix tank 10 may preferably have a capacity of at least 100 gallons, and typically the tank capacity may be one or two thousand gallons for large scale manufacture of ice cream mix. An agitator propeller 12 may be placed in the tank for gentle circulation of the contents.

Blow tube 14 is also provided, entering the top of container 10 and extending to a position adjacent the bottom thereof, as shown.

A source of nitrous oxide 16 communicates via line 18 through check valve 20 and filter 22 to gas recirculating pump 24. From there, the nitrous oxide gas proceeds via line 26 past check valve 28 and shut-off valve 30 to the upper end of blow tube 14.

Preferably, the nitrous oxide is provided from source 16 at a pressure of about 50 psi. The nitrous oxide passes from the lower end of blow tube 14 to form large bubbles 32 of nitrous oxide in the ice cream mix 34. As bubbles 32 rise through the mix, microscopic gas bubbles of nitrous oxide are entrained into the ice cream mix. The residue of bubbles 32 collect in upper space 36 of mix tank 10.

From there, the nitrous oxide may be drawn off the top of tank 10 through line 38, shut-off valve 40, moisture trap 42, and check valve 44, to connect with line 18 at T-connection 46 at a position upstream of gas recirculating pump 24. Thus, a recirculating flow of nitrous oxide gas is provided through lines 26 and 38, with added nitrous oxide being provided to the system through line 18 as needed to cause the pressure to be maintained at its predetermined level. The gas flow rate may be as high as possible while avoiding spattering of ice cream mix into line 38.

The recirculation of nitrous oxide gas through ice cream mix 34 may continue for a predetermined period of time and a predetermined pressure, which is empirically found, to provide the desired amount of overrun. When mix tank 10 is a 5 gallon container; pressurized nitrous oxide is provided at 50 psi through dip tube 14; and a typically soft serve ice cream mix is being treated, one may typically recirculate nitrous oxide through the system for a period of 45 to 60 minutes with a nitrous oxide flow rate of 90 fluid ounces in volume per minute.

A venting line 48, with shut-off valve 50, may also be provided to the apparatus as shown.

After the desired level of gas entrainment has been provided so that the ice cream mix exhibits proper overrun upon freezing, the contents of mix tank 10 may be drained into a series of 5 gallon containers 53 or the like through bottom drain 54 of tank 10, having shut-off valve 56.

Since it is desirable to maintain a predetermined elevated pressure on ice mix 34 during storage and, in the case of soft ice cream, until the product is delivered to the consumer, an auxiliary air pressurization system 52 is provided. Air enters line 54, passing through filter 56, air compressor 58, check valve 60, and compressed air reservoir 62. From there, the compressed air may pass through pressure regulator 66, which may be adjusted to deliver air to line 68 at 50 psi. Pressure shut-off switch 70 may shut the system off when a pressure of 75 psi is sensed. The air at controlled pressure passes through line 68, check valve 70, and shut-off valve 72 to enter the top of container 10.

Accordingly, when sufficient nitrous oxide has been applied to the ice cream mix 34, values 30 and 40 may be shut off and air supply system 52 actuated to pressurize the top of mix tank 10. Tank 10 is drained of its contents into a series of containers 52. Containers 53 may each have a valved vent 74, so that the ice cream mix, pressurized at 50 psi, for example, can fill each container 53 while displacing air through one-way valve vent 74, until each container 53 is filled. The use of air to pressurize ice cream mix 34 during the drain phase and storage assists in stabilizing the overrun of ice cream mix 34. The use of nitrous oxide to pressure the ice cream mix while storing could result in further absorption of nitrous oxide into the ice cream mix, causing a possibly undesired increase in the overrun. Pressurized air tends to be less compatible with many forms of ice cream mix, and thus does not tend to significantly increase the overrun in that circumstance.

Accordingly, by this invention, ice cream mix can be prepared, shipped, and stored whereby, upon freezing, the resultant ice cream exhibits a relatively stabilized overrun when compared with ice cream manufacturing processes of the prior art.

The above has been offered for illustrative purposes, only, and is not intended to limit the scope of the invention of this application, which is as defined in the claims below.

I claim:

1. The method of entraining gas into an unfrozen ice cream mix which comprises: introducing a compatible, overrun-producing gas to a lower portion of a tank containing unfrozen mix at elevated pressure until sufficient gas bubbles are entrained in the ice cream mix to provide the desired overrun, and including the step of introducing to the top of said tank a pressurized gas having a lower tendency to be absorbed by said unfrozen ice cream mix to maintain a predetermined pressure thereon to permit said entrained ice cream mix to be stored under pressure.

2. The method of claim 1 in which said elevated pressure is at least 20 psi.

3. The method of claim 2 in which said elevated pressure is 30 to 200 psi.

4. The method of claim 1 in which the overrun-producing gas is collected at an upper portion of the tank and recirculated into the lower portion of the tank.

5. The method of claim 1 in which said overrun-producing gas is nitrous oxide.

6. The method of claim 1 in which said tank has a volume of at least 100 gallons.

7. The method of claim 1 in which said pressurized gas introduced to the top of said tank is air.

8. The method which comprises introducing a compatible, overrun-producing gas into a lower portion of a tank containing unfrozen ice cream mix at a pressure of at least 20 psi, collecting said gas at an upper portion of the tank, recirculating it into the lower portion of the tank until sufficient gas is entrained in the ice cream mix to provide the desired overrun, and thereafter introducing pressurized air into the top of said tank while the gas-entrained contents of the tank are dispensed into pressurized containers to maintain a predetermined pressure thereon.

9. The method of claim 8 in which said elevated pressure is 30–200 psi.

10. The method of claim 9 in which said overrun-producing gas is nitrous oxide.

11. The method of claim 10 in which said tank has a volume of at least 100 gallons.

12. The method which comprises introducing a compatible, overrun-producing gas into a lower portion of a tank containing unfrozen ice cream mix at an elevated pressure of at least 20 psi, until sufficient gas bubbles are entrained in the ice cream mix to provide the desired overrun, and in which pressurized air is introduced into the top of said tank while said gas-entrained contents of the tank are dispensed into pressurized containers, to maintain a predetermined pressure thereon.

13. The method of claim 12 in which overrun-producing gas is collected at an upper portion of the tank and recirculated into the lower portion of the tank.

14. The method of claim 13 in which said tank has a volume of at least 100 gallons.

15. The method of claim 14 in which said overrun-producing gas is nitrous oxide.

* * * * *